United States Patent [19]

Carosa

[11] Patent Number: 5,499,186

[45] Date of Patent: Mar. 12, 1996

[54] THREE-PHASE POWER CONVERTER WITH FAIL SOFT CHARACTERISTICS

[75] Inventor: Paul F. Carosa, Los Angeles, Calif.

[73] Assignee: Hughes Aircraft Company, Los Angeles, Calif.

[21] Appl. No.: 178,990

[22] Filed: Jan. 7, 1994

[51] Int. Cl.⁶ .............................................. H02M 7/5387
[52] U.S. Cl. .............................. 363/132; 363/56; 363/98; 318/811
[58] Field of Search .............................. 363/56, 98, 132; 361/23, 30, 31, 33; 318/798, 800, 801, 802, 811, 812

[56] References Cited

U.S. PATENT DOCUMENTS

| | | | |
|---|---|---|---|
| 4,502,106 | 2/1985 | Glennon | 363/56 |
| 4,615,000 | 9/1986 | Fujii et al. | 363/41 |
| 4,959,573 | 9/1990 | Roberts | 310/68 R |
| 4,959,596 | 9/1990 | MacMinn et al. | 318/254 |
| 5,008,801 | 4/1991 | Glennon | 363/132 |
| 5,198,971 | 3/1993 | Recker et al. | 363/71 |

Primary Examiner—Peter S. Wong
Assistant Examiner—Adolf Berhane
Attorney, Agent, or Firm—Leonard A. Alkov; W. K. Denson-Low

[57] ABSTRACT

A DC-to-AC power converter for use with a three phase motor that allows the motor to continue to operate at reduced power in the event of a switch failure in the converter. This is accomplished by using parallel power semiconductor switch poles for each phase. The motor may be wound with parallel windings for each phase to aid current sharing of the parallel poles. This feature is not absolutely required, but the impedance of the windings help balance the currents in the parallel poles. The arrangement of parallel switch poles allows for continued operation of the motor at half of its rated power level in the event of a failure of one of the power switches. Switching frequency and duty cycle of the parallel poles are controlled by a single pulse width modulation signal which is connected to the two drive circuits that control the switches. Fuses, or other circuit disconnect devices are added between the power switch pole outputs and their respective windings of the motor to isolate a failed power switch.

14 Claims, 2 Drawing Sheets

THREE-PHASE POWER CONVERTER WITH FAIL SOFT CHARACTERISTICS

BACKGROUND

The present invention relates generally to induction motors, and more particularly, to a DC-to-AC power converter for use with such induction motors that provides for fail soft operating characteristics.

A block diagram of a prior art converter structure is shown in FIG. 1, and is illustrated for comparative purposes. The converter is operable with a three-phase motor having single poles connected to each winding. The power inverter circuit includes three poles that comprise sets of semiconductor power switches (S1a, S1b, S2a, S2b, S3a, S3b) that are individually connected to each coil of the three-phase motor. The sets of switches are switched by drive circuits DC1, DC2, DC3. The switching is controlled by pulse width modulated signals (PWM 1, PWM 2, PWM 3) to control the motor voltage or the current flowing in phase A, B, and C windings of the motor. However, if one of the power semiconductor switches S1a, S1b, S2a, S2b, S3a or S3b fails, the motor becomes nonoperational.

Consequently, it is an objective of the present invention to provide for a power converter for use with a three phase induction motor that overcomes the above disadvantages, and provides for fail soft operation in the event of any type of failure of the power switches.

SUMMARY OF THE INVENTION

The present invention provides an improvement over the circuit generally described in the Background section above. The present invention comprises a DC-to-AC power converter for use with a three phase motor that allows the motor to continue to operate at reduced power in the event of failure of a power switch in the converter. This is accomplished by using two or more parallel power switch poles for each phase. The motor may be wound with parallel windings for each phase to aid current sharing of the parallel poles. The arrangement of the parallel power switch poles allows for continued operation of the motor at a reduced power level in the event of a failure of one of the power switches. The drive circuits each comprise an overcurrent protection circuit that disables a pole in the event of the detection of an overcurrent condition. Also, a fault detection circuit is provided for disabling a defective pole in the event of failure. Fuses, or other circuit disconnect devices, are added between the power switch pole outputs and respective windings of the motor.

With the features provided by the present invention, an electric vehicle is able to "limp-home" if one of the power semiconductor switches in the inverter failed by either shorting out or becoming open. Another application for the present invention is in a motor/inverter used in a critical process.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
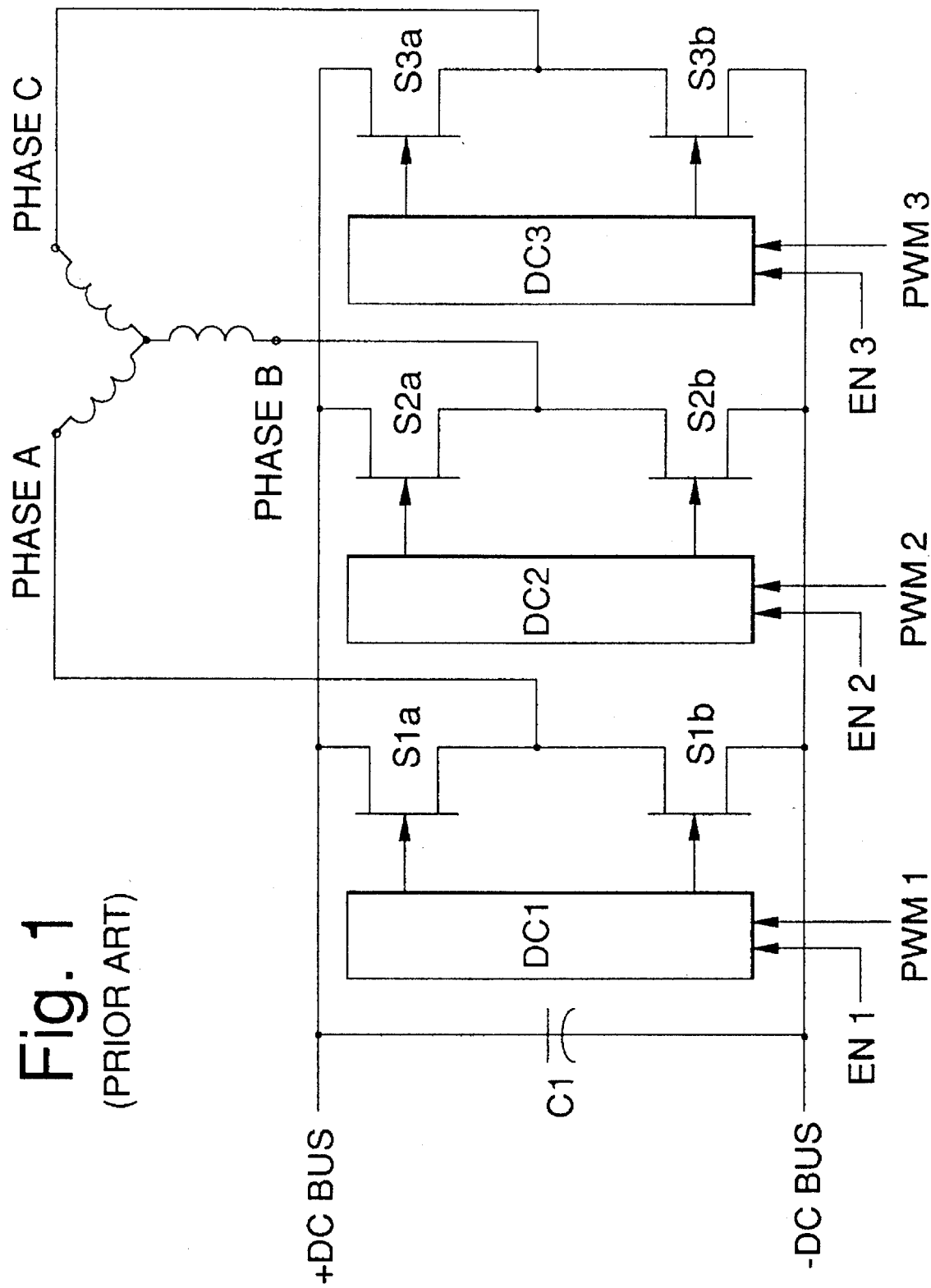
FIG. 1 illustrates a conventional power converter.

Referring to FIG. 1, it illustrates the conventional power converter that was generally described in the Background section. In this conventional power converter, if one of the power semiconductor switches S1a, S1b, S2a, S2b, S3a or S3b fail, the motor becomes non-operational. This limits the usefulness of this power converter. The present invention is adapted to overcome the limitations of this circuit design.

Figure 2:
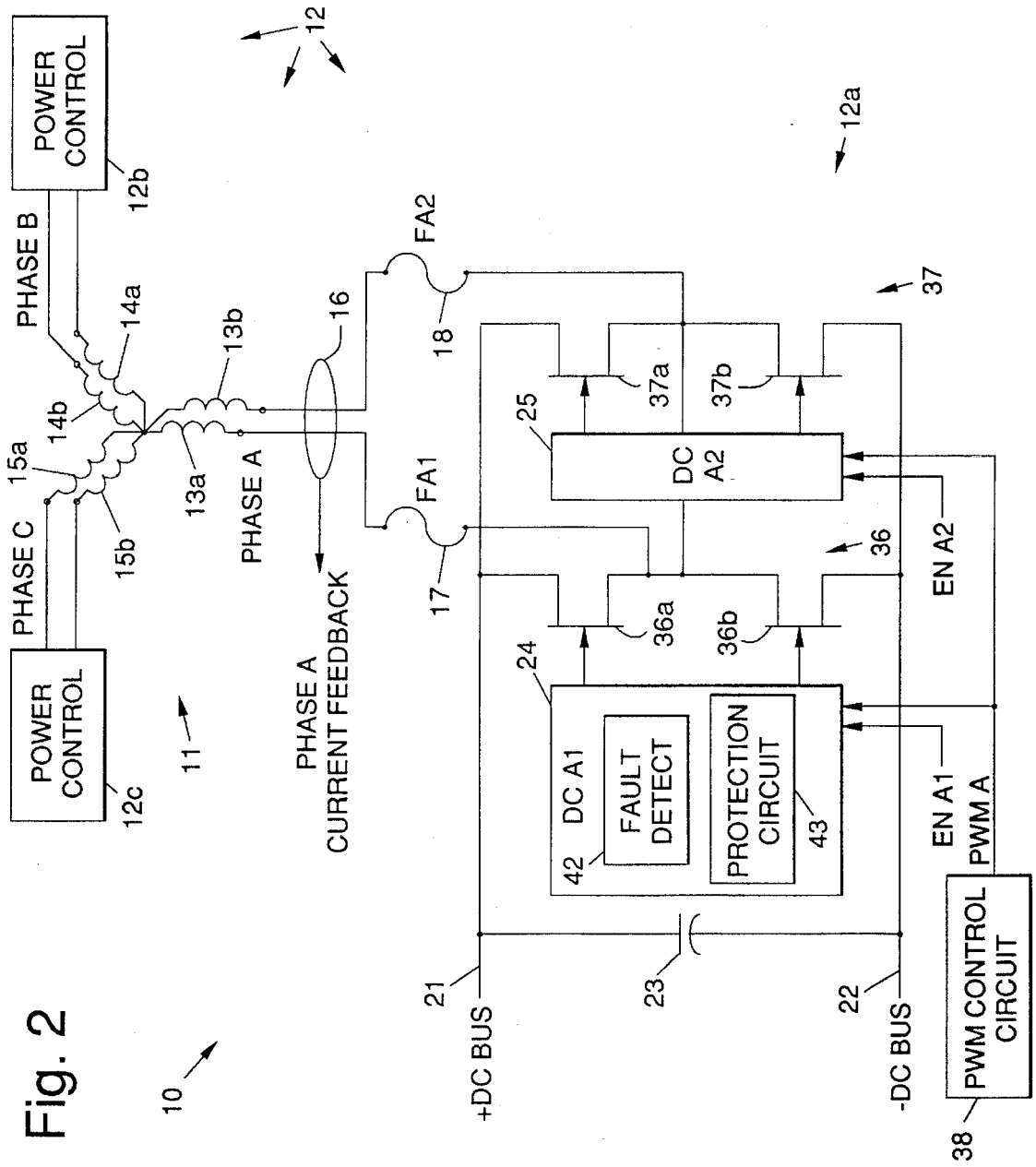
FIG. 2 illustrates a power converter in accordance with the principles of the present invention that provides for fail soft operating characteristics.

FIG. 2 illustrates a power converter 10 in accordance with the principles of the present invention for use with an induction motor 11, or brushless DC motor 11, that provides for fail soft operating characteristics. The term "fail soft" implies that the power converter 10 and the motor 11 does not totally fail or become inoperative, and hence is partially effective as a power producing element. The induction motor 11 includes three sets of double windings 13, 14, 15 comprising phase A windings 13a, 13b, phase B windings 14a, 14b, and phase C windings 15a, 15b.

Power control circuitry 12 is provided that comprises three sets of parallel poles 12a, 12b, 12c. The poles 12a, 12b, 12c are respectively coupled to each set of windings 13, 14, 15. The details of the first set of parallel poles 12a coupled to the phase A set of windings 13 is shown in detail.

The first set of parallel poles 12a is coupled by way of first and second fuses 17, 18 (also identified as FA1 and FA2), or other circuit disconnect devices 17, 18, to the respective windings 13a, 13b. The fuses 17, 18, and the four other fuses used in phases B and C, may also comprise mechanical contactors or other well-known disconnect mechanisms. If the power converter 10 regulates motor phase currents, then a current feedback sensor 16 is provided for all of the phase A windings 13, and a current feedback signal is coupled to a pulse width modulation control circuit 38.

The first set of parallel poles 12a includes two poles 36, 37 that comprise a plurality of power switches 36a, 36b, 37a, 37b coupled between positive and negative DC busses 21, 22. The power switches 36a, 36b, 37a, 37b are power semiconductor devices such as insulated gate bipolar transistors (IGBTs), Darlington bipolar transistors, or MOSFET transistors, for example.

The positive and negative DC busses 21, 22 (+DC, −DC) provide power to the respective switches 36a, 36b, 37a, 37b. A filter capacitor 23 is coupled between the respective DC busses 21, 22 (+DC, −DC) at the input to the first set of poles 12a. Each set of power switches 36a, 36b, and 37a, 37b are coupled together and are driven to supply current to a respective winding 13a, 13b through the first and second fuses 17, 18. The power switches 36a, 36b, 37a, 37b are controlled by enable signals EN A1, EN A2 coupled to the respective switches 36a, 36b, 37a, 37b by way of first and second drive circuits 24, 25 (identified as DC A1 and DC A2). The construction and operation of the drive circuits 24, 25 are generally well known in the art.

A fault detection circuit 42 is provided in each drive circuit 24, 25 that is adapted to disable a defective pole 36, 37, in the event of a failure of a power switch 36a, 36b, 37a, 37b. An overcurrent protection circuit 43 is also provided in the drive circuit 24 that is adapted to disable a pole 36, 37 from switching in the event of the detection of an overcurrent condition in a pole 36, 37. The fault detection circuit 42 and the overcurrent protection circuit 43 are conventional in design and are generally well-known to those skilled in the art. These circuits will not be described in detail herein.

The power switches 36a, 36b, 37a, 37b of the first set of parallel poles 12a are switched in a pulse width modulated fashion by means of a single pulse width modulated signal (PWM A) to control the current in the phase A windings 13a, 13b of the motor 11. The switching frequency and duty cycle are controlled by the PWM A signal by way of the two drive circuits 24, 25 (DC A1, DC A2).

The description provided above describes a converter 10 having two parallel power poles and windings per phase. In a like manner, any larger number of parallel poles or windings may be used.

The second and third poles 12b, 12c of the power control circuit 12 are substantially the same as the first pole 12a described above. These two poles 12b, 12c are illustrated by boxes 12b, 12c connected to the phase B and phase C windings, respectively. Furthermore, it is to be understood that the three sets of double windings 13, 14, 15 are not absolutely required for operation of the motor 11, but the impedance of the double windings 13, 14, 15 help to balance the currents in the sets of parallel poles 12a, 12b, 12c.

In normal operation, both parallel poles 36, 37, for example, are enabled and switched synchronously since they receive the same pulse width modulated signal (PWM A). If one of the power semiconductor switches 36a, 36b, 37a, 37b fails either in a short or open state, the fault detection circuit 42 in the appropriate drive circuit 24, 25 turns off the complementary power switch 36a, 36b, or 37a, 37b, and disables the defective pole 36, 37. For example, if switch 36a fails in the shorted state, switch 36b would experience an overcurrent and the protection circuit 43 in the drive circuit 24 would immediately turn off the switch 36a and disable the pole 36 from further switching. This has been demonstrated in a laboratory prototype of the present invention. The fault detection circuit 42 then disconnects the failed pole 36 (in this example) by clearing the fuse 17, or contactor 17, for example, coupled to the failed pole 36.

If fuses 17, 18 are used as circuit disconnect devices 17, 18 (FA1, FA2), a particular fuse 17 may be intentionally opened by turning on the appropriates switches 36a, 36b, 37a, 37b, 38a, 38b, 39a, 39b. for example, if it is desired to clear a first fuse 17 (FA1) to disconnect a first pole 36 from a first motor winding 13a and if the fault detection circuit 42 has determined that the first switch 36a has failed short, then switch 37b and all other switches 37 in the power control circuits 12b, 12c connected to the −DC bus may be turned on until the first fuse 17 clears.

If fuses are used as the disconnect devices (FA1, FA2), a particular fuse may be intentionally opened by turning on the appropriates switches 36a, 36b, 37a, 37b, 38a, 38b, 39a, 39b. For example, if it is desired to clear a first fuse FA1 to disconnect the first pole 36 from the first motor winding 13a and if the fault detection circuit 42 has determined that the first switch 36a has failed short, then switch 37b and all other switches 37 in the power control circuits 12b, 12c connected to the −DC bus can be turned on until the first fuse FA1 clears.

With the failed pole 36 disabled and disconnected from the motor windings 13, operation of the motor 11 continues at approximately 50% of its rated power. In a current controlled converter, when a failure is detected, the output current of all three phases is limited by the controller to 50% of the maximum rated current.

Thus there has been described a new and improved DC-to-AC power inverter for use with an induction motor or brushless DC motor that provides for fail soft operating characteristics. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. Apparatus comprising:

a three-phase motor having three pairs of parallel windings;

first and second DC power busses; and three switching circuits that each comprise:
(a) first and second parallel coupled switching means coupled between the first and second DC power busses, and coupled to a selected pair of parallel windings of the motor for providing AC current to the motor; and
(b) first and second drive means respectively coupled to the first and second parallel coupled switching means for switching the respective switching means to apply AC current to the selected pair of parallel windings of the motor, and wherein the first and second drive means are responsive to first and second enable signals and a pulse width modulation control signal to control the switching frequency and duty cycle of the first and second switching means.

2. The apparatus of claim 1 further comprising a circuit disconnect device coupled between each parallel pole and a respective winding of the motor.

3. The apparatus of claim 1 wherein the first and second drive means each comprise overcurrent protection means for disabling a switching means from switching in the event of the detection of an overcurrent condition therein.

4. The apparatus of claim 1 wherein the first and second drive means further comprises fault detection means for disabling a defective switching means in the event of a failure thereof.

5. The apparatus of claim 1 wherein the first and second switching means comprise insulated gate bipolar transistors.

6. The apparatus of claim 1 wherein the first and second switching means comprise Darlington bipolar transistors.

7. The apparatus of claim 1 wherein the first and second switching means comprise MOSFET transistors.

8. A three-phase motor including a DC-to-AC power converter that provides for fail soft operating characteristics of the motor, wherein the improvement comprises:

a three-phase motor having three pairs of parallel windings;

first and second DC power busses; and three switching circuits that each comprise:
(a) first and second parallel poles coupled between the first and second DC power busses, wherein each parallel pole is coupled to a respective parallel winding of a selected pair of parallel windings of the motor (b) first and second drive circuits respectively coupled to the first and second parallel poles for switching the respective poles on and off in a pulse width modulated fashion to apply AC current to the respective windings of the motor, and wherein the first and second drive circuits are responsive to first and second enable signals and respectively enable the first and second parallel poles, and a single pulse width modulation control signal that control the switching frequency and duty cycle of the first and second parallel poles.

9. The motor of claim 8 wherein the improvement further comprises a circuit disconnect device coupled between each parallel pole and a respective winding of the motor.

10. The motor of claim 8 wherein the first and second drive circuits each comprise a overcurrent protection circuit that is adapted to disable a pole from switching in the event of the detection of an overcurrent condition in the pole.

11. The motor of claim 8 wherein the first and second drive circuits further comprises a fault detection circuit that is adapted to disable a defective pole in the event of a failure of a pole.

12. The motor of claim 8 wherein the first and second parallel poles comprise insulated gate bipolar transistors.

13. The motor of claim 8 wherein the first and second parallel poles comprise Darlington bipolar transistors.

14. The motor of claim 8 wherein the first and second parallel poles comprise MOSFET transistors.

* * * * *